United States Patent

[11] 3,579,794

| [72] | Inventor | Jonathan S. Powell |
| | | 11 W. State St., Pasadena, Calif. 91105 |
| [21] | Appl. No. | 863,511 |
| [22] | Filed | Oct. 3, 1969 |
| | | Division of Ser. No. 678,932, Oct. 30, 1967, Pat. No. 3,477,750 |
| [45] | Patented | May 25, 1971 |

[54] MEANS FOR SECURING COUPLINGS TO PIPE
2 Claims, 20 Drawing Figs.

[52] U.S. Cl............................................ 29/237,
29/432.2, 29/520, 285/382.2
[51] Int. Cl........................................... B23p 19/04
[50] Field of Search........................................... 29/237,
520, 432, 432.2; 285/363, 382, 382.2, 382.7

[56] References Cited
UNITED STATES PATENTS

| 490,181 | 1/1893 | Wolcott.................. | 29/520UX |
| 1,321,324 | 11/1919 | Nelson.................... | 29/237X |
| 2,381,747 | 8/1945 | Howe..................... | 29/520UX |
| 2,805,591 | 9/1957 | Widmer................... | 285/382X |
| 3,019,520 | 2/1962 | Woolley................... | 29/520X |
| 3,121,941 | 2/1964 | Bellarts................... | 285/382UX |
| 3,304,602 | 2/1967 | Osborne................... | 29/520X |
| 3,343,252 | 9/1967 | Reesor..................... | 29/520X |
| 3,474,519 | 10/1969 | Hallesy................... | 29/237UX |

*Primary Examiner*—Charlie T. Moon
*Attorney*—Lyon & Lyon

ABSTRACT: A means and method of constricting a coupling having internal teeth onto a pair of abutting pipe sections; the means comprising an assembly of split rings which may be secured around a pair of abutting pipe sections and a coupling having internal teeth initially slidable on the pipe sections, at least one of the rings containing a constricting die adapted, when forced axially over the coupling, to constrict the coupling and force the teeth into the pipe sections; a hydraulic ram being placed between a pair of rings to effect relative movement of the die and coupling and thus constrict the coupling. One embodiment involves a pair of constricting dies movable toward each other and another involving a single die and a sleeve for forcing the coupling through the die.

PATENTED MAY 25 1971 3,579,794

INVENTOR.
JONATHAN S. POWELL
BY
Lyon & Lyon
ATTORNEYS

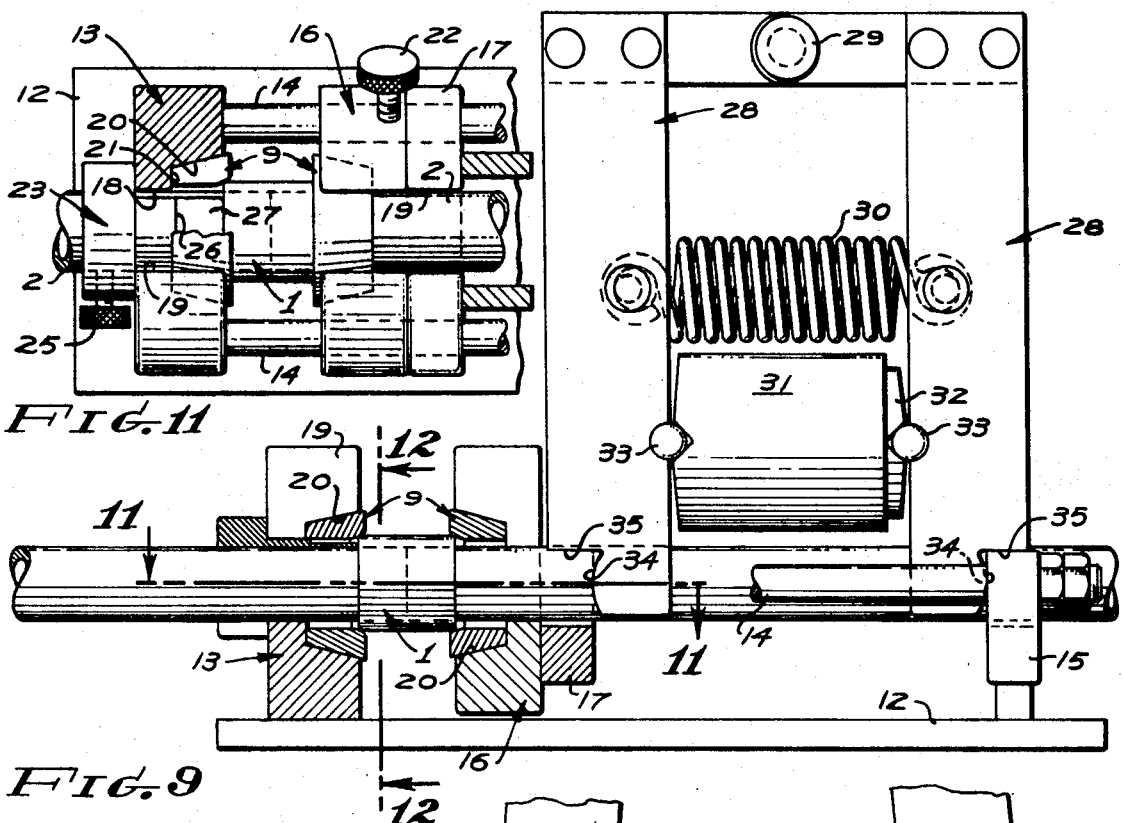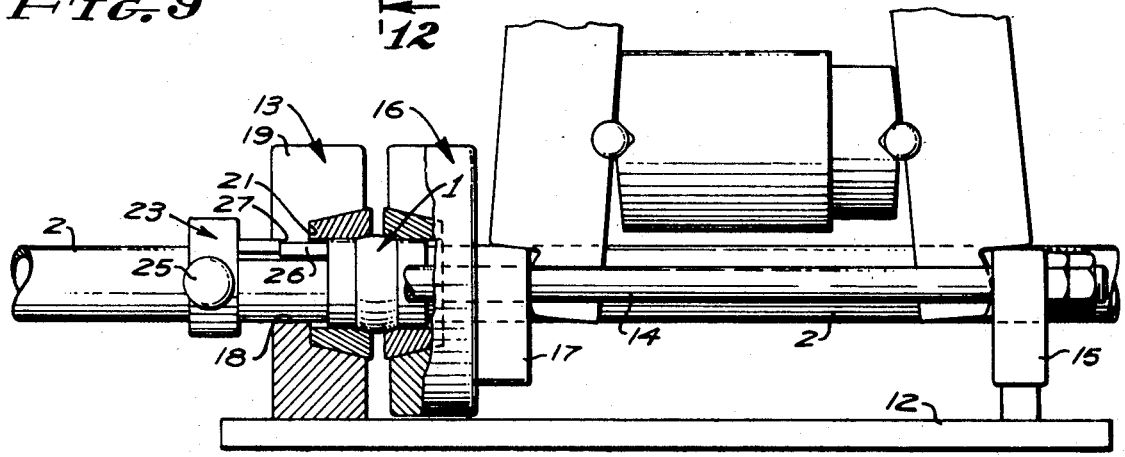

INVENTOR.
JONATHAN S. POWELL
BY
ATTORNEYS 3,579,794

1

MEANS FOR SECURING COUPLINGS TO PIPE

This application is a division of the previous application, Ser. No. 678,932 filed Oct. 30, 1969, now U.S. Pat. No. 3,477,750, entitled: PIPE COUPLING AND MEANS AND METHOD OF ASSEMBLY, in that the present invention includes the means and method originally disclosed and claimed in the previous application. The present application is also a continuation-in-part of the previous application in that it includes an embodiment of the means and method not included in the previous application.

BACKGROUND OF THE INVENTION

The conventional means and method of joining conventional iron pipe, such as domestic gas or water pipe, involves the use of couplings having, internally, tapered screw threads, and a pair of pipe sections each having mating tapered screw threads. These profiles and proportions of screw threads have for many years been standardized and are commonly called "-pipe threads." It is customary to coat the pipe threads with plumbers putty.

It has been the custom in assembling pipe to prepare, ahead of use, standard short lengths of pipe with screw threads and to provide prescrew-threaded couplings, unions, T's, elbows and the like; then in the field, cut the remaining pipe to length and cut the screw threads immediately prior to assembly. Often, the place of assembly is in a trench or other awkward location. Clearance must be provided between adjoining pipe sections so that they may be drawn together by the coupling, and the pipe sections must be capable of rotating during assembly, otherwise a more expensive and less dependable union must be used.

SUMMARY OF THE INVENTION

The present invention utilizes a special constrictable coupling disclosed and claimed in the hereinbefore identified application and is directed to a means and method of assembling the coupling and adjacent sections of iron pipe in such a manner as to save materially the cost in time and labor as compared to the assembly of pipe threaded parts. Accordingly then, the objects of my invention include:

First, to provide a means and method of coupling pipe which requires no finishing of the pipe ends other than to cut the ends substantially square; the means and method utilizing a coupling having hardened annular teeth, the coupling being constricted and caused to penetrate the metal of the pipe sections to form a series of annular seals and to develop an interlocking connection with the pipe sections which exceed the strength of the pipe sections.

Second, to provide an embodiment of the means and method of securing a coupling on a pair of pipe sections in which the coupling initially fits slidably over the pipe ends and is then constricted radially and progressively from its extremities toward its center so that each annular tooth is pressed individually into the metal at the pipe ends.

Third, to provide an embodiment of the means and method of securing a coupling on a pair of pipe sections in which the coupling initially fits slidably over the pipe ends and then is constricted radially and progressively from one end to the other, each annular tooth being pressed individually into the pipe.

Fourth, to provide a means and method of assembly which accepts standard iron pipe without surface preparation although such pipe has a loose diameter tolerance.

Fifth, to provide a means and method of assembly which not only establishes a satisfactory seal, but also provides a connection between adjacent pipe which is stronger than the pipe; that is, in tension tests the pipe sections fail before the coupling or the connected parts.

Sixth, to provide a means and method of assembly which is particularly advantageous when joining pipe sections located in awkward places or joining pipe sections which cannot be rotated or moved axially during assembly.

Seventh, to provide a coupling of this type which may be employed to join plastic pipe to metal pipe or metal fittings.

DESCRIPTION OF THE DRAWINGS

FIG. 9 is a side view showing one embodiment of the means for assembling the coupling onto the abutting ends of two pipe sections, the apparatus being shown in its initial condition just prior to action of its constricting dies.

FIG. 10 is a similar side view thereof, showing the apparatus fragmentarily, and in the condition assumed upon completion of the assembly operation.

FIG. 11 is a fragmentary sectional view, taken through 11-11 of FIG. 9.

FIG. 12 is a sectional view taken through 12-12 of FIG. 9 with the pipe and coupling omitted.

FIG. 13 is a perspective view of the fixture for facilitating positioning of the coupling.

Figure 1:
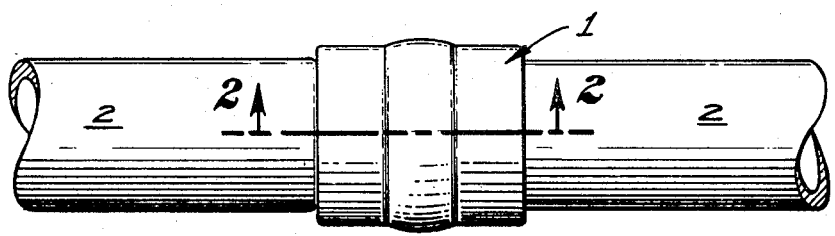
FIG. 1 is a side view of the pipe coupling and adjacent portions of the pipe sections joined by the coupling.
Figure 2:
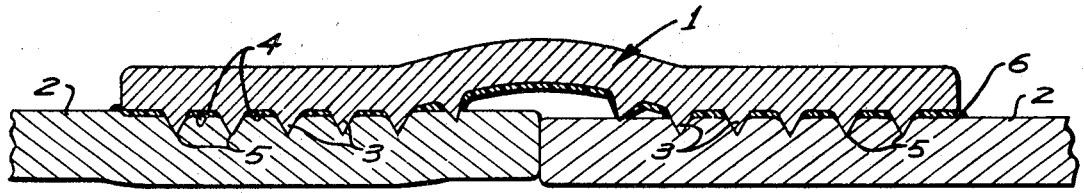
FIG. 2 is an enlarged fragmentary longitudinal sectional view, taken through 2-2 of FIG. 1.
Figure 3:
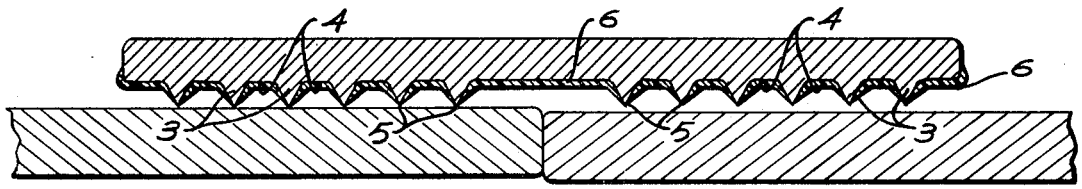
FIG. 3 is a sectional view similar to FIG. 2, showing the same parts before the pipe coupling has been secured in place.

The coupling utilized in the present invention is in the form of a sleeve 1, initially dimensioned to fit slidably over a pair of abutting pipe sections 2. The coupling sleeve is intended primarily for use with iron pipe and is therefore preferably formed of the same material from which the pipe is made. An iron alloy corresponding to that from which standard iron pipe is made has been found satisfactory.

The sleeve 1 is provided with a series of internal annular teeth 3, separated by annular channels 4 which are cylindrical and vary in width depending on the size of pipe. The teeth are triangular in cross section, and form radially inwardly directed apeces 5. The optimum included angle of these apeces is in the order of 60, but may range between 40 and 80°.

Initially, the diameter of the coupling is such that the annular teeth 3 slidably receive a corresponding end of a pipe section 2. When the coupling has been assembled on the pipe and secured in position, the coupling has been constricted an amount equal to the depth of the teeth 3, and the teeth have penetrated into the pipe sections their full depth, the coupling is fully secured to the pipe.

It should be noted that for many conditions of use, the intimate fit between the annular teeth 3 and the underlying pipe sections provides a complete seal without the use of an intervening seal. However, to ensure a seal in every instance, the inner surface of the coupling may be coated with a sealant 6, such as rubber or other elastomer, or other plastic material having elastomeric qualities. It will be noted that the sealant tends to collect in the channels 4 and when the coupling is constricted onto the pipe ends, the coating is severed into bands by pressure of the teeth 3 against the pipe sections. The thickness of the sealant coating may be minimal and the coupling sleeve is constricted to the point that the sealant coating completely fills the spaces between the bottoms of the channels 4 and the confronting surface of the pipe section.

Figures 7, 8:
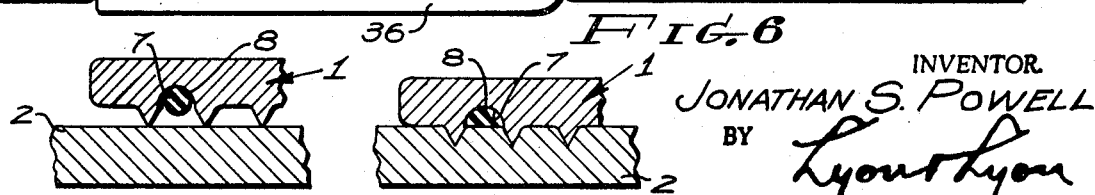
FIG. 7 is a fragmentary sectional view showing a modified form of the coupling incorporating an O-ring type seal before being secured to a pipe.
FIG. 8 is a similar view showing the modified form of coupling secured to an end of a pipe.
Figure 14:
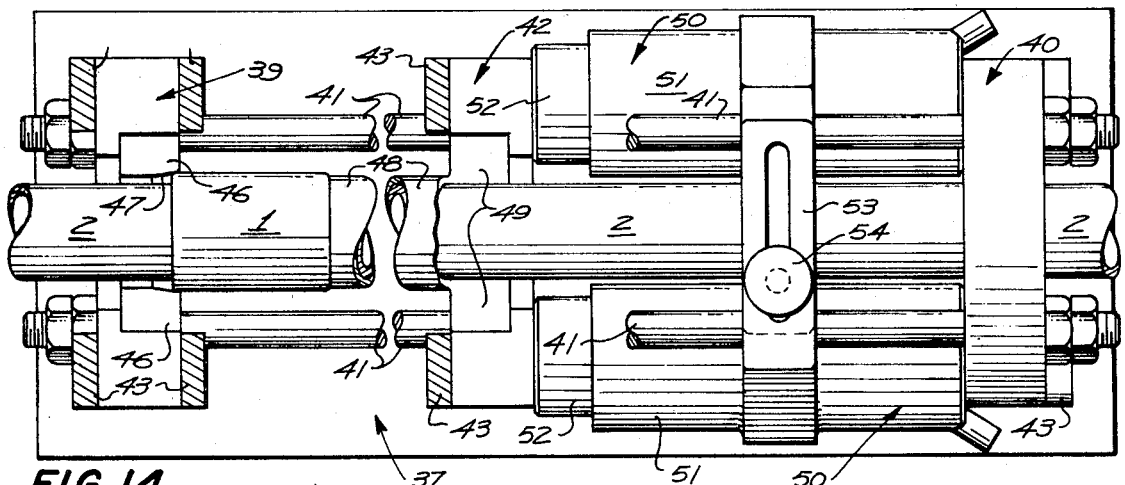
FIG. 14 is a longitudinal, partially plan and partially sectional view, showing another embodiment of the means for assembling the coupling onto the abutting ends of two pipe sections, the sectional portion being taken through 14-14 of FIG. 15.

Alternatively, as shown in FIGS. 7 and 8, one or more of the channels at each end may be deepened to form a seal ring groove 7 which receives a seal ring 8. Each seal ring may be a conventional O-ring and the effective area of the groove 7 when the coupling is secured is preferably equal to or slightly less than the cross section of the seal ring to place the material comprising the seal ring under compression.

Figures 4, 5:
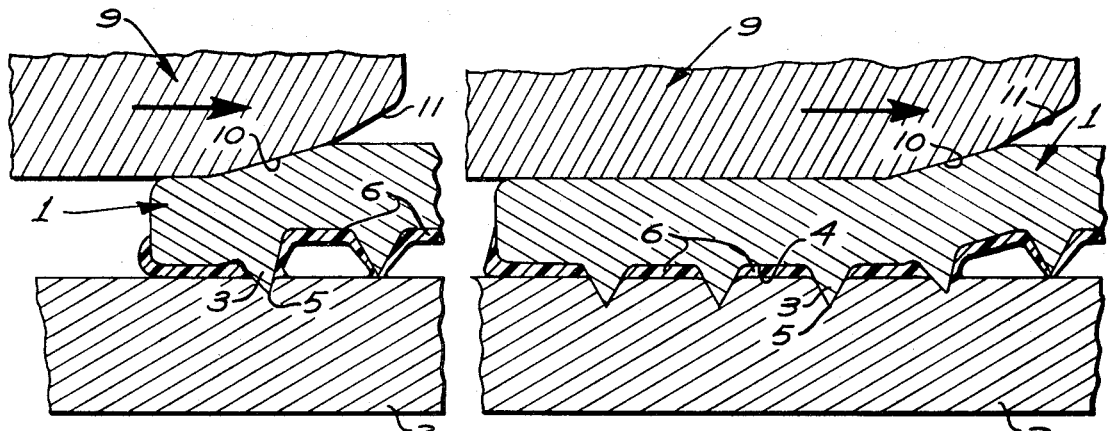
FIG. 4 is a further enlarged fragmentary sectional view showing the pipe coupling and underlying pipe end and a constricting die in the initial step of constricting the pipe coupling onto the end of a pipe.
FIG. 5 is an enlarged fragmentary sectional view similar to FIG. 4, showing further progress of the step of constricting the pipe coupling onto an end of a pipe.

Constriction of the coupling sleeve is accomplished by annular constriction dies 9. Each die includes a constricting cone 10, having a working length approximately equal to the distance between the teeth 3, and a clearance end cone 11 preceding the working or constricting cones 10. As will be brought out in more detail hereinafter, the constricting dies 9 are thrust axially toward each other from the extremities of the coupling sleeve so that the teeth 3 are pressed consecutively into the ends of the pipe sections 2, as represented in FIGS. 4 and 5.

It should be noted that standard iron pipe does not have a precise outer diameter; in fact, the diameter may vary as much as a sixteenth of an inch. In order to develop the full strength of the teeth 3, it is desirable that the teeth penetrate their full depth into the pipe sections, or nearly so. Therefore, the constricting dies are dimensioned so that essentially full penetration will be obtained when securing the coupling to a pipe of minimum diameter. If the pipe be of maximum diameter, the pipe itself is constricted or reduced in diameter by the dies 9.

As indicated previously, the volume of the seal ring grooves 7 is equal to the volume of the seal rings so that when the coupling sleeve is constricted, the seal rings completely fill their respective grooves and may even be under compression, but cannot flow from the groove due to the intimate fit between the bordering teeth 3 and the underlying pipe section 2.

The means for assembling the coupling and the pipe sections will now be described.

The assembling means includes a baseplate 12, on which is mounted a fixed die holder 13. Two guide and tension bars 14 extend from the fixed die holder and are secured to a fixed abutment block 15 mounted on the baseplate 12. A slidable die holder 16 is mounted on the bars and a slidable abutment block 17 is also mounted on the bars 14.

Other than that the one die holder is fixed and the other slidable, the die holders 13 and 16 are identical. Each is provided with a central opening 18 and a side slot 19 dimensioned to clear the pipe section. Each die holder is provided with a die recess 20, having tapered sidewalls and terminating in a thrust shoulder 21. Each constricting die 8 is in the form of a diametrically split ring, the parts of which are held in complementary relation by the walls of the recess 20. The walls of the die holders are relatively heavy and the die holders are preferably heat treated so as to resist any expansion force exerted by the dies.

It has been found desirable to provide setscrews 22 which extend radially through the die holders and engage the pipe sections merely to hold the pipe sections in place during installation of the pipe sections and the coupling sleeve in the assembling means.

As an aid in positioning the pipe sections and coupling in the assembling means, a placement fixture 23 is provided which includes a yoke 24 adapted to be slipped laterally over one of the pipe sections and secured thereto by a setscrew 25. A semicylindrical blade 26 extends axially from the yoke 24 and is provided with a reference shoulder 27 located one-half the length of the coupling from the extremity of the blade. The yoke is fastened temporarily to one of the pipe sections in such a manner that the distance from the end of the blade 26 to the extremity of the pipe section is equal to the distance between the extremity of the blade and the reference shoulder 27. This can easily be done by casual observation as slight difference in the inserted depth of the two pipe sections is not critical. The yoke is placed on the pipe section which is received in the fixed die holder 13.

After the pipe sections and coupling have been placed in the die holders, and the dies have been fitted into the recesses 20, the slidable die holder 16 is moved manually toward the fixed die holder until the dies are abutting the ends of the coupling sleeve.

In order to force the dies toward each other and towards the center of the coupling sleeve, a ram unit is placed between the slidable abutment block 17 and the fixed abutment block 15. The ram unit includes a pair of L-shaped frames 28, having relatively short arms which are joined together by a pivotal connection 29. The remaining or larger arms of the L-frames are drawn together by a spring 30 placed therebetween. Also placed between the ram frames is a cylinder 31 and a piston 32, and interposed between the piston and cylinder and their respective ram frames are bearing pins 33. The extremities of the ram frames remote from the pivotal connection 29 are provided with cam faces 34 which engage the abutment blocks 15 and 17. Adjacent the cam faces are positioning shoulders 35 which rest on the abutment blocks 15 and 17.

In order to operate the ram unit, pressure fluid is supplied from a pressure line, not shown. The pressure fluid causes the ram piston 32 to extend from the cylinder 31, forcing the cam faces 34 away from each other and thus forcing the slidable abutment block 17, slidable die holder 16 and its die toward the fixed die holder and its die so that the die holders move from the position shown in FIG. 9 to the position shown in FIG. 10, and the constriction dies 9 are caused to move progressively along the coupling sleeve 1.

It will be noted that by reason of the fact that the axial length of the constricting cones 10 approximates the distance between adjacent teeth 3, the teeth are constricted in sequence and the amount of force required is minimized. In order that the teeth will readily withstand the loads imposed, and be capable of penetrating the ends of the pipe sections, the teeth are case hardened. Preferably, the teeth are hardest at their apeces and gradually decrease in hardness toward their root ends. The sleeve itself is preferably annealed.

It has been found that a small conventional hydraulic hand pump is adequate for effecting the assembly operation of a conventional iron pipe and the coupling of nominally 1-inch diameter. When the assembly operation is completed, the pressure fluid is released for return to the pumping unit and the spring 30 returns the piston 32 into the cylinder 31. Whereupon the assembled coupling and pipe sections may be removed. It will be noted that the assembling means is relatively compact so that it may be employed in cramped spaces. Also, it will be noted that no axial or rotational movement of the pipe sections is required.

Figure 6:
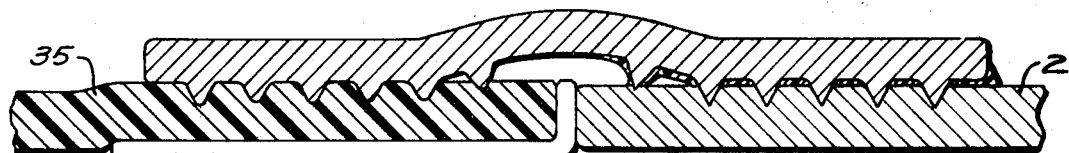
FIG. 6 is a fragmentary sectional view corresponding to FIG. 2, showing a modified form of the coupling for joining a plastic pipe to a metal pipe.

Reference is directed to FIG. 6 which illustrates a modification for joining a plastic pipe 35 to a metal pipe 2, or fitting having a similar end. In this case, a metal sleeve 36 is placed inside the end of the plastic pipe to support the plastic pipe. The sleeve 1, metal pipe 2 and plastic pipe 35 are assembled and the sleeve constricted as previously described. It is preferred, however, to modify the annular ribs engaging the plastic pipe by rounding their inner extremities to avoid cutting the plastic material. Also, if desired, the seal 6 or seal ring 8 may be omitted from the end of the coupling receiving the plastic pipe, as the plastic pipe itself readily serves this purpose.

Reference is now directed to FIGS. 14 through 20. The construction here illustrated differs from the preceding structure in that the coupling sleeve is forced entirely through a constricting die rather than constricted from both ends by a pair of dies.

The modified construction includes a baseplate 37. Supported near the ends of the baseplate, on suitable pedestals 38, are split rings 39 and 40 which are connected by tie bars 41. A third split ring 42 is slidable on the tie bars.

Each of the rings is split diametrically and the two halves are joined by at least a pair of diametrically disposed links 43, mounted on fixed hinge pins 44 and removable hinge pins 45, the latter located so that on removal the upper half of the corresponding split ring may be raised and moved clear of the lower half so that a pair of pipe ends 2 and a coupling 1 may be inserted.

The split ring 39 receives a diametrically split constricting die 46, the two halves being suitably secured in the corresponding portions of the split ring 39 by retainer screws, not shown. When closed, the constricting die 46 forms a conical die face 47. In this regard, the conical die face 47 may be provided with a considerably less slope than the corresponding die face 10 of the first described constricting die.

The split ring 42, which is slidable on the tie bars 41, receives a diametrically split ram sleeve 48, the external diameter of which is slightly less than the bore through the constricting die 46. One end of the ram sleeve is provided with a mounting flange 49, the two halves of which are suitably secured in the corresponding parts of the split ring 42 by screws, not shown.

Removably mounted between the split ring 42 and the split ring 40 is a pair of ram units 50 which comprise cylinders 51 and pistons 52. The ram units are connected by an adjustable yoke 53 so that they may be laterally separated or moved together to permit insertion between the tie bars 41 as well as between the split rings 40 and 42. A setscrew 54 secures the ram units in their operative position.

The openings through the split rings 39, 40 and 42 are sufficiently large that a range of pipes may be accommodated by changing the size of the constricting dies 46 and the ram sleeves 48. To secure pipes of different size, the split ring 42 is provided with a screw-threaded radial hole which receives a pipe retaining screw 55.

Figures 15, 16, 17:
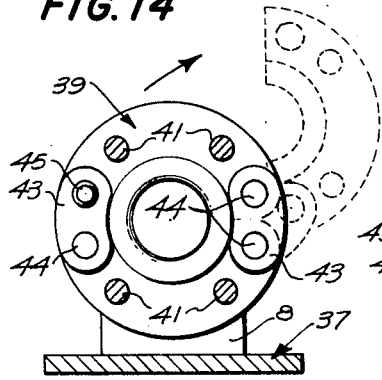
FIG. 15 is a transverse sectional view taken through 15-15 of FIG. 14 showing the coupling constricting die and indicating by dotted lines the die in its open position.
FIG. 16 is a transverse sectional view taken through 16-16 of FIG. 14 showing the ram sleeve.
FIG. 17 is a transverse sectional view taken through 17-17 of FIG. 14 showing one of the drive units in end elevation.

Operation of the embodiment shown in FIGS. 14 through 20 is as follows:

In order to receive or remove a pair of pipe ends 2 and the coupling 1, all of the split rings are opened to positions corresponding to the dotted line position shown for the split ring 39 in FIG. 15. After inserting the appropriate constricting die 46 and ram sleeve 48 for a particular size of pipe, the pipe ends are placed in the lower portions of the constricting die 46 and ram sleeve 48 and the coupling is slipped over one pipe end and then back over the other until the abutting ends of the two pipe ends are approximately opposite the center of the coupling. This preparation for operation joining the coupling and pipe ends is accomplished with the ram units 50 removed and the split ring 42 backed from the split ring 39.

The retaining screw 55 is used so that a corresponding pipe end may protrude from the ram sleeve 48, approximately half the length of the coupling, thus permitting the coupling to be relatively centered between the abutting pipe ends.

Figure 18:
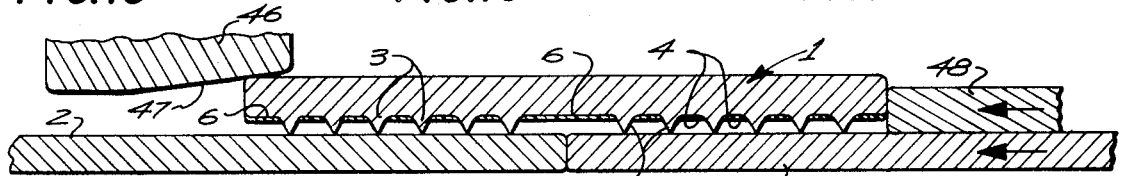
FIG. 18 is an enlarged fragmentary sectional view showing a coupling and adjacent portions of pipe as well as the constricting die and ram as the parts appear before the constricting operation begins.
Figure 19:
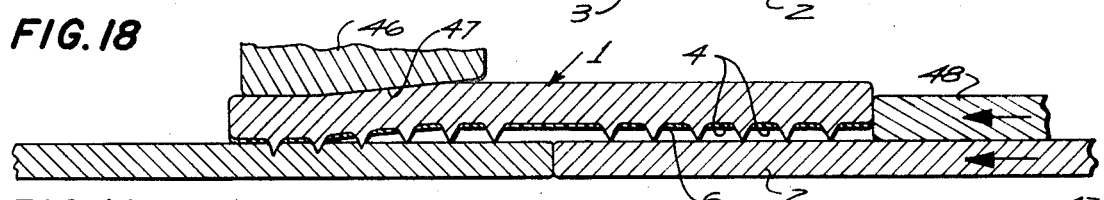
FIG. 19 is a similar enlarged fragmentary sectional view showing the constricting operation in an intermediate stage.
Figure 20:
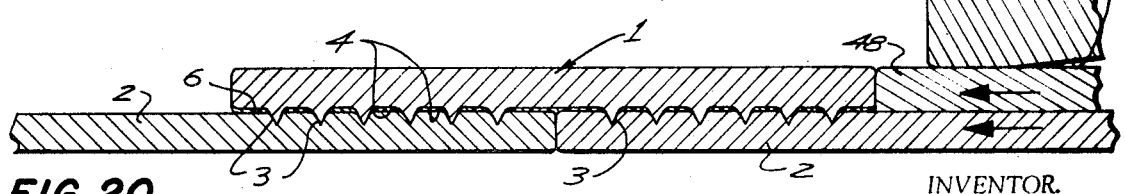
FIG. 20 is also a similar enlarged fragmentary sectional view showing completion of the constricting operation.

When the preliminary assembly is complete, and the split rings have been secured in their closed positions, the ram units 50 are positioned between the split rings 40 and 42. When fluid pressure is applied to the ram units, the split ring 42 and its ram sleeve 48 are forced against the coupling 1 so that the opposite end is forced into the constricting die 46, as indicated in FIG. 18. Continued thrust causes the annular teeth 3 to be constricted sequentially and pressed into the underlying pipe end 2. This operation continues until the coupling has been forced entirely through the constricting die 46, as shown in FIG. 20. Once the coupling has penetrated the constricting die, the split rings may be readily separated to permit removal of the pipe ends and coupling; or, more accurately, the constricting apparatus may be removed from the coupled pipe sections after first removing the ram units.

The present embodiments of this invention are to be considered in all respects as illustrative and not restrictive.

I claim:

1. A means for securing a coupling sleeve having a set of internal teeth initially slidable over abutting pipe ends, said means comprising:
    a. a pair of split end rings;
    b. a split intermediate ring disposed between the end rings;
    c. the rings adapted to be opened for lateral insertion of said coupling sleeve and pipe ends, and closed to retain the coupling sleeve and pipe ends therein;
    d. a split constricting die received in one of the end rings, the die having a tapered die face adapted, when forced axially over the coupling sleeve, to constrict the coupling sleeve progressively and cause sequential penetration of the internal teeth into the underlying pipe ends;
    e. a split element carried by said intermediate ring adapted to engage the coupling sleeve in opposition to the die;
    f. and thrust means disposed between one of the end rings and the intermediate ring to force said die and element toward each other thereby to constrict the coupling sleeve.

2. A means, as defined in claim 1, wherein:
    a. said element is a ram sleeve dimensioned to pass through the constricting die thereby to thrust the coupling sleeve entirely through the constricting die.